(12) United States Patent
Tanaka et al.

(10) Patent No.: US 6,175,682 B1
(45) Date of Patent: *Jan. 16, 2001

(54) HIGH-SPEED FILING SYSTEM

(75) Inventors: Shosuke Tanaka; Mitsutaka Enomoto, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/944,957

(22) Filed: Oct. 7, 1997

(30) Foreign Application Priority Data

Oct. 14, 1996 (JP) .................................. 8-271046

(51) Int. Cl.[7] ................................................ H04N 5/76
(52) U.S. Cl. ............................................ 386/92; 386/112
(58) Field of Search ........................... 386/46, 95, 125, 386/126, 122, 65, 111, 112, 109, 104, 92, 52; H04N 5/76

(56) References Cited

U.S. PATENT DOCUMENTS

| | | | |
|---|---|---|---|
| 4,963,995 | * 10/1990 | Lang | 386/104 |
| 5,187,589 | * 2/1993 | Kono et al. | 386/83 |
| 5,592,450 | * 1/1997 | Yonemitsu et al. | 386/126 |
| 5,621,579 | * 4/1997 | Yuen | 386/95 |
| 5,719,985 | * 2/1998 | Ito et al. | 386/125 |
| 5,758,008 | * 5/1998 | Tozaki et al. | 386/111 |
| 5,900,904 | * 5/1999 | Okada et al. | 348/7 |
| 5,905,847 | * 5/1999 | Kobayashi et al. | 386/125 |

* cited by examiner

Primary Examiner—Huy Nguyen
(74) Attorney, Agent, or Firm—Jay H. Maioli

(57) ABSTRACT

A high-speed filing system has a formatter and cache memory for converting video signal data supplied from a plurality of input signal sources into data of a common intermediate format, a data mass storage for adding identification headers to the converted video signal data, recording the video signal data with the identification headers as a series of successive data at a high speed, and reading the recorded video signal data, a sorter, buffer, and cache memory for rearranging the read video signal data according to the input signal sources based on the identification headers, and a data mass storage for recording the rearranged video signal data as filing data on a filing recording medium.

8 Claims, 7 Drawing Sheets

HIGH-SPEED FILING SYSTEM

BACKGROUND OF THE INVENTION

1. Field of the Invention

The present invention relates to a high-speed filing system for use as an archive system for preserving material tapes in broadcasting stations, for example, under such conditions that allow them to be played back when desired.

2. Description of the Related Art

Television broadcasting stations, production houses, etc. archive recorded broadcast programs on tapes which are the same as original material tapes in the same formats as those of the original material tapes with bibliographic details added.

There has been a demand for archiving digital data of recorded contents of a plurality of original material mediums having different formats.

Such original material mediums include 16-mm films, Quad (2-inch) tapes, β-CAM (1-inch) tapes, u-matic tapes, etc. A great number of video image heritages that have been recorded in these various mediums are present worldwide.

The amount of such existing video image data is huge, and the amount of newly produced video image data is also increasing. Unless a new archiving technology is proposed for converting the existing and newly produced video image data efficiently into video image data in other mediums, it is impossible to initiate a project to archive the existing and newly produced video image data available in different mediums.

It is necessary to add, to archived video image data, ID data which will be used to identify the original medium in which the archived video image data was recorded, when the archived video image data is read for reuse. Furthermore, when filing data is generated with respect to video image data to be archived, the operator is required to check the filing data and then generate ID data. Therefore, the amount of work which the operator must perform is so large that the entire process is practically infeasible.

It is estimated that the time required for archiving the existing and newly produced video image data is 10 years if they are archived by the system available at the turn of the 20th century, and 2 years if they are archived by a high-data-rate data recorder at a data ratio of 1:1.

According to the conventional archive system, heretofore, it has been customary to preserve recorded video image data on tapes which are the same as original material tapes or mediums in the same formats as those of the original material tapes or mediums. On the other hand, video image data recorded in different formats cannot be archived because they exist in large quantities unless a new archiving technology is proposed for converting the video image data efficiently into video image data in other mediums.

Furthermore, when filing data is generated with respect to video image data to be archived by the conventional archive system, the operator is required to check the filing data and then generate ID data. Therefore, the amount of work which the operator must perform is very large.

SUMMARY OF THE INVENTION

It is therefore an object of the present invention to provide a high-speed filing system for simultaneously generating filing data for archiving purposes, from a plurality of mediums without interruptions.

According to the present invention, there is provided a high-speed filing system comprising converting means for converting video signal data supplied from a plurality of input signal sources and processed by input processing means into data of a common intermediate format, recording means for adding identification headers to the video signal data converted by the converting means and recording the video signal data with the identification headers as a series of successive data, reproducing means for reading the video signal data recorded by the recording means, data arranging means for rearranging the video signal data read by the reproducing means according to the input signal sources based on the identification headers, and filing recording means for recording the video signal data rearranged by the data arranging means as filing data on a filing recording medium, whereby filing data can simultaneously be generated from the video signal data from the input signal sources and recorded without interrupting the supply of the video signal data from the input signal sources.

The high-speed filing system operates as follows.

When material tapes or the like are loaded into playback devices and the playback devices operate in a reproducing mode, the playback devices output reproduced video signal data as data streams which correspond to input signals from the input signal sources.

The data streams are divided into segment data of a suitable size, and headers are automatically generated and added to starting ends of the segment data, generating segment data with headers. The converting means thus converts the video signal data supplied from the input signal sources into video signal data of the intermediate format.

The converted video signal data of the intermediate format are packaged into packages having a length of the segment data, and headers are added to starting ends of the segment data, after which the packages are temporarily stored. The packages as they are generated and stored are monitored, and are selected and outputted successively in the sequence in which they have been generated and stored.

When the recorded data reach a burst size that can be written most efficiently into the recording means, the recorded data start being transferred. The stored data are randomly read, generating data streams as successive burst streams at a transfer rate that matches the data rate of the recording means.

Header data are registered as contents data in the recording means. In the recording means, header IDs or contents data are written into a magnetic recording medium attached to a cassette that is used. The process of writing the data streams into the recording means and the processing writing the header IDs or contents data into the magnetic recording medium depend only on the general transfer rate of input data with the writing data rate of the recording means being the upper limit.

The data written in the recording medium are handled as intermediate data. The recording means is used as a high-speed, large-capacity memory for keeping the input data available real-time. When it is detected that one unit of data to be written in the recording means is stored in the recording means, all the data are read and written into the recording means.

Concurrent with the process of generating a data format in an input processing system and the process of generating a data stream in the input processing system, a process of generating separate data is carried out by a transfer processing system. The data randomly recorded by the recording means are reproduced by the reproducing means. The data arranging means gathers data of the same kinds according to the headers, separates and arranges the data according to their kinds, and arranges the segments according to a series of programs, generating separate data.

The separate data are supplied to the filing recording means. The filing recording means records the separate data in the sequence of segment numbers such that one program will be recorded in one cassette.

Specifically, the data arranging means detects IDs in the package data reproduced by the reproducing means, gathers packages of the same kinds supplied from the input signal sources of the same types depending on the IDs, and separates and arranges the packages of the same kinds, generating separate data. The separate data are stored up to such a data quantity that they can simultaneously be written in the filing recording means. The data stored up to the predetermined data quantity are recorded by the filing recording means.

In this manner, filing data are generated according to IDs of the headers by the data arranging means, and recorded on the recording medium by the filing recording means. The filing data serve as primary archival data of the intermediate format.

DETAILED DESCRIPTION OF THE PREFERRED EMBODIMENT

Figure 1:
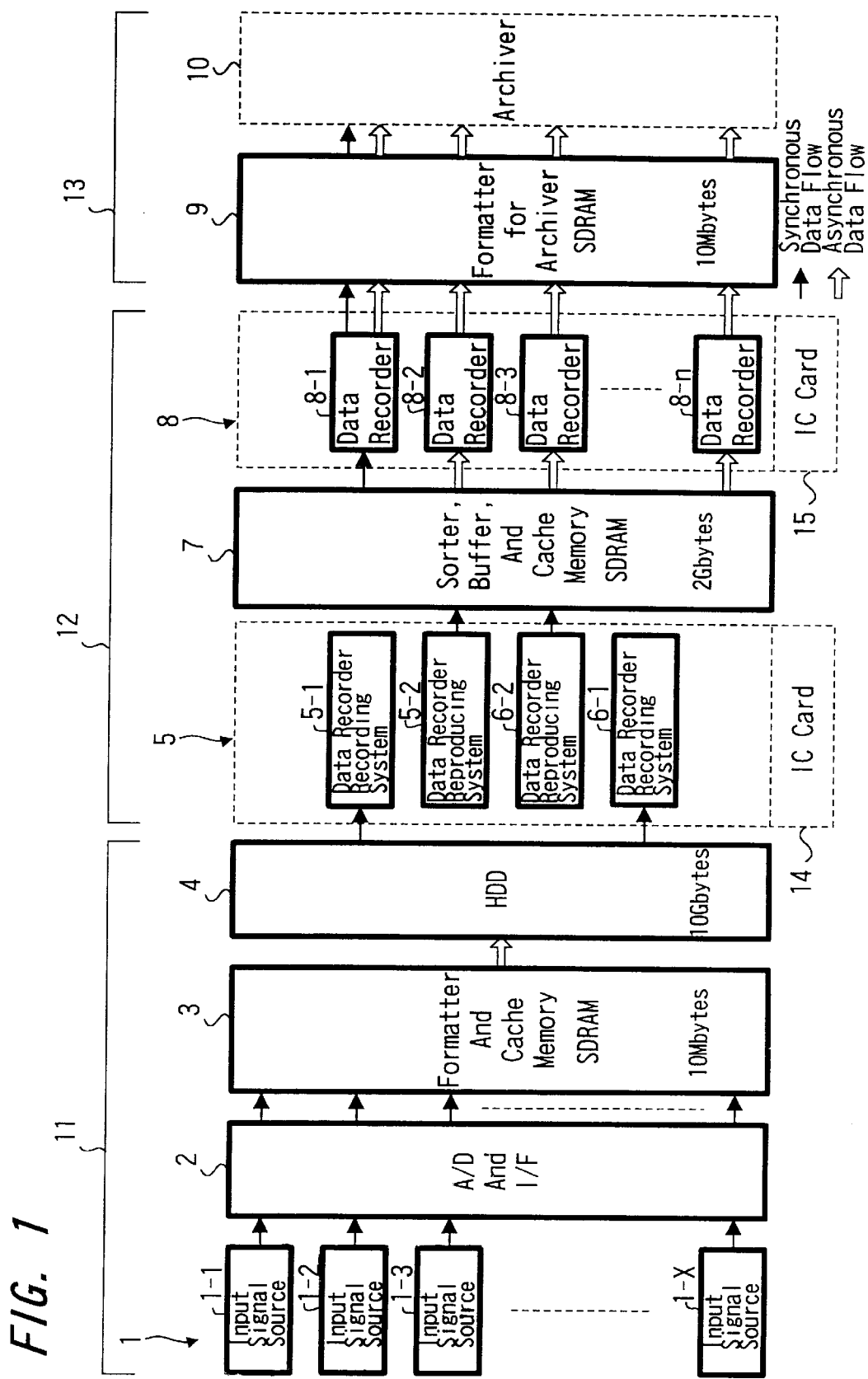
FIG. 1 is a block diagram of a high-speed filing system according to the present invention.

As shown in FIG. 1, a high-speed filing system according to the present invention generally comprises an input processing system 11, a transfer processing system 12, and an archive processing system 13. The input processing system 11 has a plurality of input signal sources 1, an analog-to-digital (A/D) converter and interface circuit 2, a formatter and cache memory 3, and a hard disk drive 4. The transfer processing system 12 has a data mass storage 5, a sorter, buffer, and cache memory 7, and a data mass storage 8. The archive processing system 13 has an archive formatter 9 and an archive 10.

The input signal sources 1 include a plurality of input signal sources 1-1, 1-2, 1-3, . . . , 1-X. The input signal sources 1-1, 1-2, 1-3, . . . , 1-X are existing material mediums such as 16-mm films, Quad (2-inch) tapes, β-CAM (1-inch) tapes, u-matic tapes, etc., for example, having different formats which can be played back by different material playback devices including VTRs.

The A/D converter and interface circuit 2 includes an A/D converter for converting analog video signal data from the input signal sources 1 into digital video signal data. The A/D converter and interface circuit 2 includes interfaces for interfacing digital video signal data from the input signal sources 1 according to interfacing processes depending on the material playback devices. The A/D converter and interface circuit 2 serves as input processing means for processing input data from the input signal sources 1-1, 1-2, 1-3, . . . , 1-X.

The formatter and cache memory 3 has formatters for converting digital video signal data reproduced by the material playback devices and supplied from the input signal sources 1 into digital video signal data having an intermediate format, and cache memories which are of a small storage capacity and can be accessed at a high speed. The intermediate format is not a format which will finally be archived, but a basic format that can easily be converted into a format which will finally be archived.

The formatter and cache memory 3 serves as converting means for converting video signal data supplied from the input signal sources 1-1, 1-2, 1-3, . . . , 1-X and processed by the input processing means.

Figure 7:
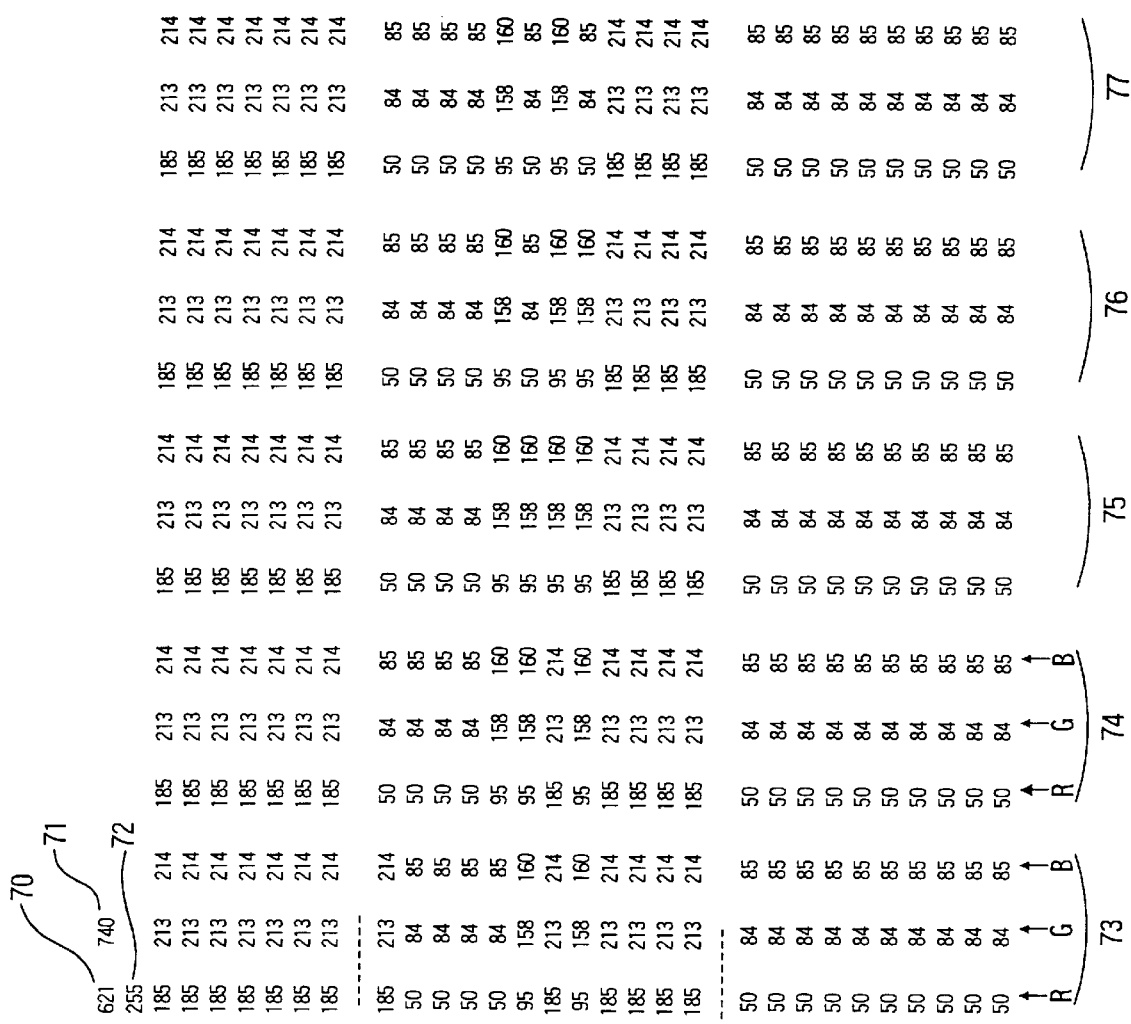
FIG. 7 is a diagram of an intermediate format.

FIG. 7 shows the intermediate format. As shown in FIG. 7, the intermediate format has 621 points of horizontal data represented by the number 70 of horizontal data, 740 points of vertical data represented by the number 71 of vertical data, and 255 points of maximum data represented by the number 72 of maximum data (0~255). The intermediate format has R (red), G (green), B (blue) data for each of pixel columns 73, 74, 75, 76, 77. The intermediate format is called "ppm" (portable pixmap file format).

The formatter and cache memory 3 is in the form of an SDRAM (Synchronous Dynamic Random Access Memory) having a storage capacity of 10 Mbytes. The SDRAM is a high-speed data transfer DRAM, as a variant of a standard DRAM, having compatibility between input and output levels. The SDRAM has a data transmission circuit improved for continuously reading and writing data in synchronism with an input clock signal, and allows address data to be inputted and data to be inputted and outputted independently parallel to each other for operation at a clock frequency of 100 MHz at maximum.

The hard disk drive 4 comprises a plurality of large-capacity, high-speed hard disk drive units, and has disc caches for recording and playback systems. The hard disk drive 4 is in the form of RAID (Redundant Arrays of Inexpensive Disks) having a storage capacity of 10 Gbytes, but may be MO (magnetooptical disks), PD (optical disks), or semiconductor memories.

Figure 2:
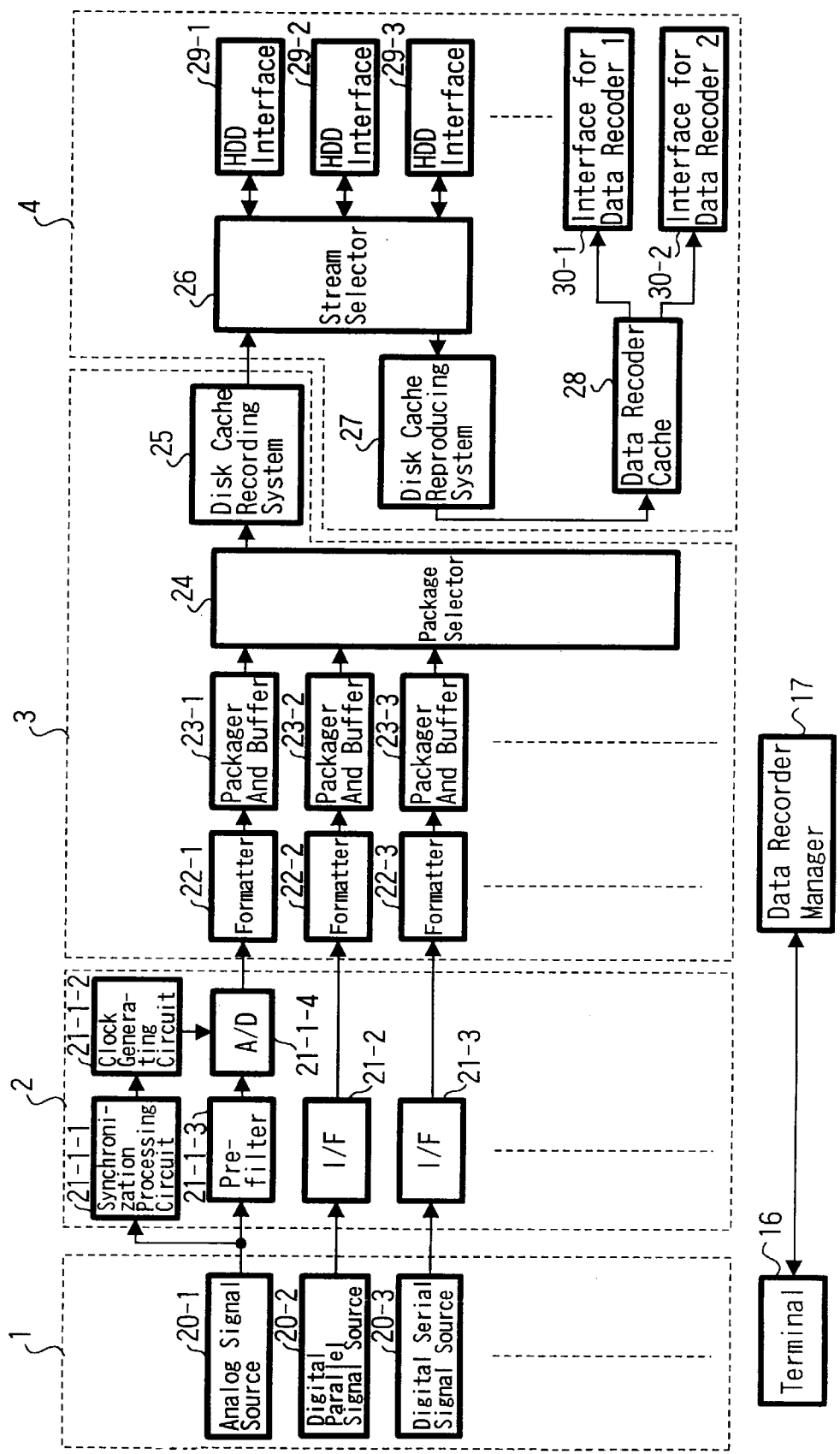
FIG. 2 is a block diagram of an input processing system of the high-speed filing system.

FIG. 2 shows details of the input processing system. As shown in FIG. 2, the input signal sources 1 include an analog signal source 20-1, a digital parallel signal source 20-2, a digital serial signal source 20-3, . . . .

The A/D converter and interface circuit 2 has a synchronous processing circuit 21-1-1 for detecting a synchronizing signal from analog video signal data supplied from the analog signal source 20-1, a clock generator 21-1-2 for generating a clock signal for A/D conversion from the synchronizing signal, an A/D converter 21-1-4 for converting analog video signal data into digital video signal data based on the clock signal, and a pre-filter 21-1-3 for limiting the frequency band of the analog video signal data depending on the frequency band thereof to prevent aliases from being introduced into the digital video signal data.

The converter and interface circuit 2 also has interfaces 21-2, 21-3, . . . for interfacing digital video signal data from the digital parallel signal source 20-2, the digital serial signal source 20-3, . . . according to the interfacing processes depending on the material playback devices.

The formatter and cache memory 3 has formatters 22-1, 22-2, 22-3, . . . for converting digital video signal data from the analog signal source 20-1, the digital parallel signal source 20-2, the digital serial signal source 20-3, . . . into digital video signal data having the intermediate format.

The formatter and cache memory 3 also has packager and buffers 23-1, 23-2, 23-3, . . . for packaging the digital video signal data formatted in the intermediate format into packages having a length of given segment data, adding headers to the segment data, and temporarily storing the packages of given segment data with the added headers.

The formatter and cache memory 3 further has a package selector 24 for monitoring the packages produced by and stored in the packager and buffers 23-1, 23-2, 23-3, . . . , and selecting and outputting the packages successively from the packager and buffers 23-1, 23-2, 23-3, . . ., and a disk cache recording system 25 for writing at a high speed the packaged data supplied from the package selector 24.

The hard disk drive 4 has a stream selector 26 for distributing and supplying striping units, which are units to be written, of data streams of the packaged data from the disk cache recording system 25 of the formatter and cache memory 3 to the hard disk arrays, and combining striping units reproduced from the hard disk arrays with the data streams of the packaged data and outputting them. The hard disk drive 4 also has HDD interfaces 29-1, 29-2, 29-3, . . . for supplying the striping units from the stream selector 26 to the hard disk arrays and writing the striping units in the hard disk arrays, and reading reproduced striping units from the hard disk arrays.

The hard disk drive 4 also has a disk cache reproducing system 27 for writing at a high speed the reproduced data streams of the packaged data from the steam selector 26, a data recorder cache 28 for writing at a high speed the reproduced data streams of the packaged data from the disk cache reproducing system 27, and a data recorder 1 interface 30-1 and a data recorder 2 interface 30-2 for outputting the data streams of the packaged data from the data recorder cache 28 to data recorder arrays and writing them in the recorder arrays.

The disk cache recording system 25 and the disk cache reproducing system 27 operate as small-capacity, high-speed caches with respect to the hard disk arrays which are of a high capacity and operate at a relatively low speed. The data recorder cache 28 operates as a small-capacity, high-speed cache with respect to data recorders which are of a high capacity and operate at a relatively low speed. The stream selector 26 detects when one unit of data (1 Gbyte) to be written in the data recorders is stored in the hard disk arrays. Upon such detection, the stream selector 26 reads all the data from the hard disk arrays, transfers the data to the disk cache reproducing system 27, from which the data are supplied through the data recorder cache 28 and written alternately into two data recorder recording systems 5-1, 6-1 through the data recorder 1 interface 30-1 and the data recorder 2 interface 30-2.

A data recorder manager 17 serves to manage the above operation sequence of the input processing system 11. A terminal 16 serves to supply instructions to the data recorder manager 17.

As shown in FIG. 1, the data mass storage 5 of the transfer processing system 12 has four data recorders including a data recorder recording system 5-1, a data recorder reproducing system 5-2, a data recorder recording system 6-1, and a data recorder reproducing system 6-2, and an IC card 14. The data recorder recording system 5-1 and the data recorder recording system 6-1 are capable of alternately writing at a high speed units of data (each of 1 Gbyte) from the input processing system 11. Specifically, the data recorder recording systems 5-1, 6-1 serve as recording means for adding identification headers to video signal data converted by the converting means and recording the video signal data and the headers as successive data, and the data recorder reproducing systems 5-2, 6-2 serve as reproducing means for reading data recorded by the recording means.

One example of the data recorders is data recorder DIR-1000 in which the speed of tape transport is variable depending on the speed of data recording. The data recorder DIR-1000 has been independently developed by the applicant, and is based on the unified world format "ANSI ID-1" for data recorders. This data recorder has a maximum data rate of 256 Mbits/s and a large recording capacity of 770 Gbits.

In this data recorder, image data is recorded on one track according to the ID-1 format. On one track, there are recorded 256 sync blocks and a preamble preceding and a postamble following the 256 sync blocks. An outer error code is provided in sync blocks of the 256 sync blocks.

Data recorded in one sync block is of 153 bytes. 4 bytes are assigned to sync data, 1 byte to an ID, and 8 bytes to an inner error code. Therefore, data of 153×(256 −20)=36,108 bytes are recorded on one track. The ID of a header generated by the formatter and cache memory 3 is recorded in one sync block.

The IC card 14 is attached to a cassette, and index information with respect to data written by the first data recorder recording system 5-1 and the second data recorder recording system 6-1 is transferred to and held by the IC card 14. The index information of the IC card 14 may be recorded and managed on the hard disk arrays by the data recorder manager 17, or recorded and managed in an index region on a tape in the cassette.

Cassettes in which data have been recorded are managed by a robot device (not shown) which loads cassettes into the data recorder recording system 5-1 and the data recorder recording system 6-1 and unloads cassettes from the data recorder reproducing systems 5-2, 6-2 and manages and holds the unloaded cassettes. The data recorder reproducing system 5-2 and the data recorder reproducing system 6-2 are capable of reproducing data recorded in the cassettes.

Figure 3:
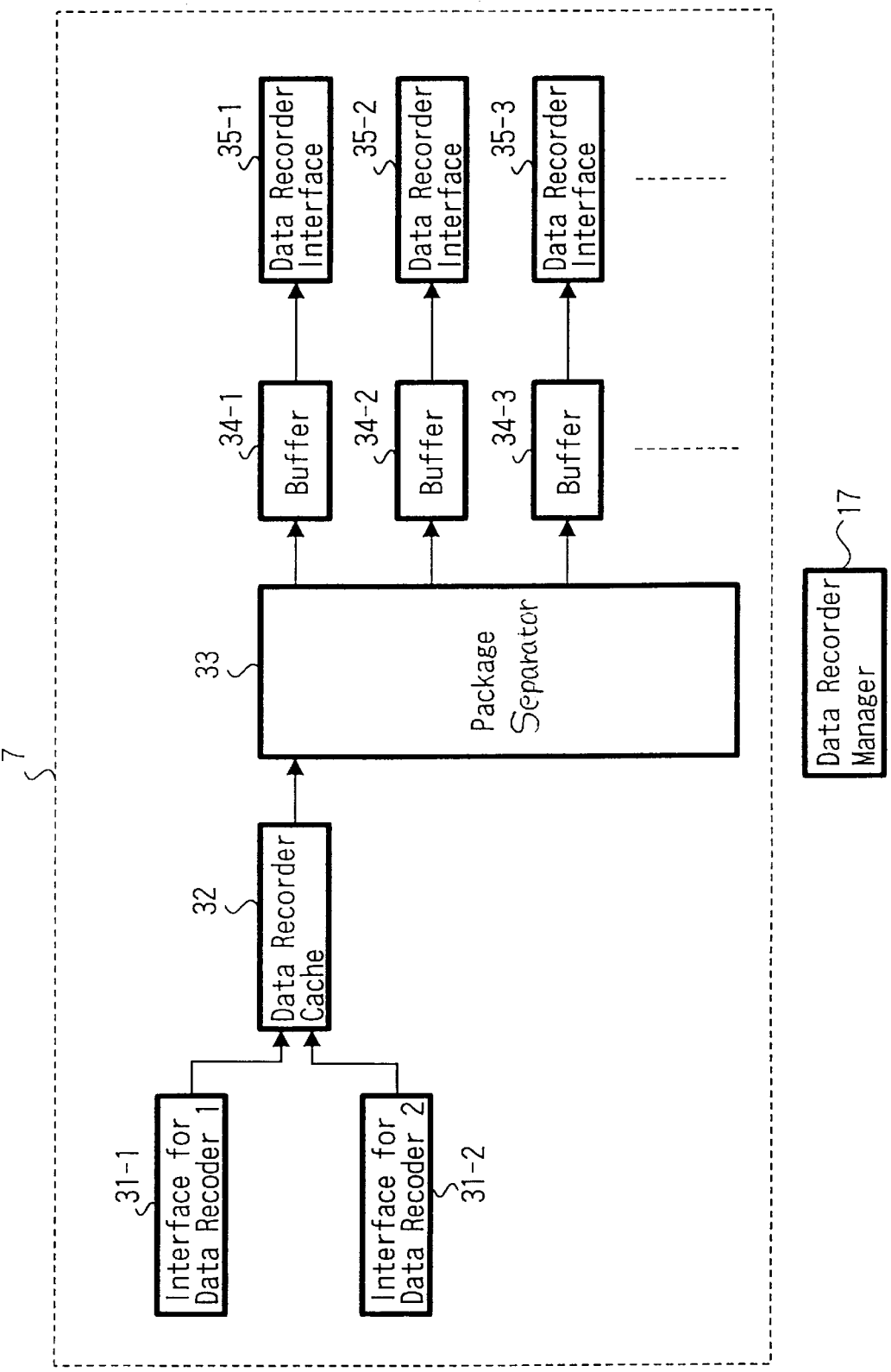
FIG. 3 is a block diagram of a transfer processing system of the high-speed filing system.

FIG. 3 shows in detail the sorter, buffer, and cache memory 7 of the transfer processing system 12. As described above with reference to FIG. 1, the data mass storage 5 precedes the sorter, buffer, and cache memory 7, and the data mass storage 8 follows the sorter, buffer, and cache memory 7. The sorter, buffer, and cache memory 7 comprises an SDRAM having a storage capacity of 2 Gbytes. The sorter, buffer, and cache memory 7 serves as data arranging means for rearranging data read by the data recorder reproducing systems 5-2, 6-2 in the order of the original input signal sources based on the headers.

The sorter, buffer, and cache memory 7 has a data recorder 1 interface 31-1, a data recorder 2 interface 31-2, a data recorder cache 32, a package separator 33, buffers 34-1, 34-2, 34-3, . . . , a data recorder interface 35-1, a data recorder interface 35-2, a data recorder interface 35-3, . . .

The data recorder 1 interface 31-1 and the data recorder 2 interface 31-2 are capable of extracting reproduced data from the data recorder reproducing system 6-2. The data recorder cache 32 is capable of successively storing package data from the data recorder reproducing system 5-2 and the data recorder reproducing system 6-2.

The package separator 33 is capable of detecting IDs in headers of package data from the data recorder cache 32, collecting packages supplied from the same input signal source depending on the detected IDs, and separating and arranging packages of the same kind. The buffers 34-1, 34-2, 34-3 are capable of storing the separated package data up to such a data quantity that they can simultaneously be written in the data mass storage 8. The data recorder interface 35-1, the data recorder interface 35-2, and the data recorder interface 35-3 are capable of inputting and writing the package data into the data mass storage 8.

The data mass storage 8 has a data recorder 8-1 having a data rate and a recording capacity corresponding to those of the data recorder recording system 5-1 and the data recorder reproducing system 5-2 or the data recorder recording system 6-1 and the data recorder reproducing system 6-2 of the data mass storage 5. The data mass storage 8 also has data recorders 8-2, 8-3, . . . , 8-n having a data rate and a recording capacity lower than those of the data recorder recording system 5-1 and the data recorder reproducing system 5-2 or the data recorder recording system 6-1 and the data recorder reproducing system 6-2 of the data mass storage 5. The data mass storage 8 serves as filing recording means for recording data of the original input signal sources from the data arranging means as filing data on a filing recording medium.

In this fashion, filing data for respective IDs of headers are generated by the package separator 33, and recorded on the filing recording medium by the data mass storage 8. The filing data are primary archival data in the intermediate format.

The data mass storage 8 also has an IC card 15. The IC card 15 is attached to a cassette, and index information with respect to data written by the data recorders 8-1, 8-2, 8-3, . . . , 8-n is transferred to and held by the IC card 15. The index information of the IC card 15 may be recorded and managed on the hard disk arrays by the data recorder manager 17, or recorded and managed in an index region on a tape in the cassette.

The data recorder manager 17 serves to manage the above operation sequence of the transfer processing system 12. The terminal 16 serves to supply instructions to the data recorder manager 17.

The archive processing system 13 has the archive formatter 9 and the archive 10, as described above. The archive formatter 9 comprises an SDRAM having a storage capacity of 10 Mbytes. The archive formatter 9 is capable of reading the primary archival data of the intermediate format which has been generated and recorded by the transfer processing system 12, adding ID data to the primary archival data if necessary, and converting the primary archival data into data of an archive format compatible with a regular retrieval system. The archive 10 stores the converted data of the archive format on a data base recording medium, thereby generating a data base.

Operation of the high-speed filing system according to the present invention will be described below. As described above, there is a demand for the preservation and management of a huge amount of video image cultural heritages in the form of an archive. In the following description of operation of the high-speed filing system, attention will be given to the format in which the huge amount of video image information will be converted into digital data.

The high-speed filing system is a system for classifying original data of all formats, including various formats such as 16-mm films, 2-inch (Quad) tapes, 1-inch (type-C) tapes, D1, D2, D3 tapes, and striping units such as HD (hard disks), adding IDs, and automatically converting the data into data of an intermediate format from which they can be converted into data of all digital formats, simply when mediums of the original data are loaded into original playback devices such as VTRs, HDDs, etc. and reproduced thereby.

Figure 4:
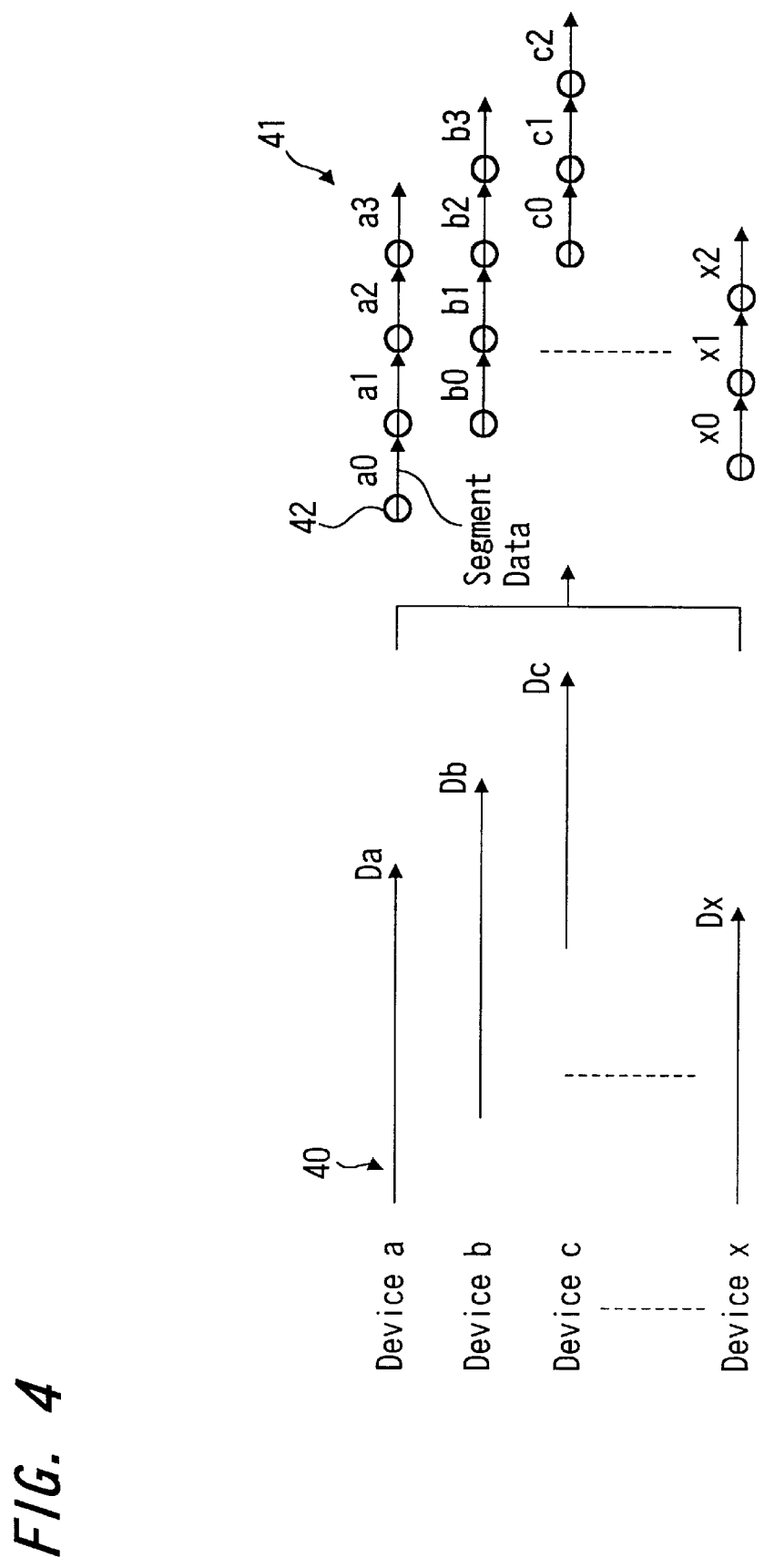
FIG. 4 is a diagram illustrating a process of generating a data format in the input processing system.

A process of generating a data format in the input processing system will be described below with reference to FIG. 4. Material tapes or the like are loaded into devices a, b, c, x such as VTRs, HDDs, etc. When they start being played back, the devices a, b, c, ... x output reproduced video data (including audio data and subdata) as digital data streams 40 Da, Db, Dc, . . . , Dx. The digital data streams 40 Da, Db, Dc, . . . , Dx shown in FIG. 4 correspond respectively to input signals supplied from the input signal sources 1-1, 1-2, 1-3, . . . 1-x shown in FIG. 1. The process of generating a data format will be described below in relation to FIG. 1. In FIG. 1, the solid-line arrows represent synchronous data flows, and the blank-line arrows represent asynchronous data flows.

The digital data streams 40 Da, Db, Dc, . . . , Dx are inputted to and processed by the A/D converter and interface circuit 2, and then supplied to the formatter and cache memory 3. In the formatter and cache memory 3, the digital data streams 40 Da, Db, Dc, . . ., Dx are divided into segment data 43 of a suitable size. leaders 42 are automatically generated, and added to the beginning ends of the respective segment data. The digital data streams 40 Da, Db, Dc, . . ., Dx are thus converted into segment data 41 a0, a1, a2, a3, b0, b2, b3, c0, c1, c2, . . . x0, x1, x2 each with a header.

The process of generating a data format in the input processing system 11 shown in FIG. 4 will be described with reference to FIG. 2.

In FIG. 2, an analog input signal from the analog signal source 20-1 is supplied to the A/D converter and interface circuit 2. That is, analog video signal data from the analog signal source 20-1 is supplied to the synchronous processing circuit 21-1-1 and the pre-filter 21-1-3. When the synchronous processing circuit 21-1-1 detects a synchronizing signal from the analog video signal data, it supplies the synchronizing signal to the clock generator 21-1-2, which generates a clock signal for A/D conversion from the synchronizing signal. The pre-filter 21-1-3 limits the frequency band of the analog video signal depending on the frequency band thereof to prevent aliases from being introduced into digital video signal data. The band-limited analog video signal is supplied to the A/D converter 21-1-4. The A/D converter 21-1-4 converts the analog video signal into a digital video signal based on the clock signal from the clock generator 21-1-2.

Digital input signals from the digital parallel signal source 20-2, the digital serial signal source 20-3, . . . are supplied to the A/D converter and interface circuit 2. That is, digital video signal data from the digital parallel signal source 20-2, the digital serial signal source 20-3, . . . are supplied to the interfaces 21-2, 21-3, The interfaces 21-2, 21-3, . . . interface the digital video signal data according to the interfacing processes depending on the material playback devices.

The digital video signal data which have been converted from the analog video signal data and interfaced are supplied to the formatter and cache memory 3. The formatters 22-1, 22-2, 22-3, . . . convert the digital video signal data from the analog signal source 20-1, the digital parallel signal source 20-2, the digital serial signal source 20-3, . . . into digital video signal data having the intermediate format.

The packager and buffers 23-1, 23-2, 23-3, package the digital video signal data formatted in the intermediate format into packages having a length of given segment data, add headers to the segment data, and temporarily store the packages of given segment data with the added headers. The package selector 24 monitors the packages produced by and stored in the packager and buffers 23-1, 23-2, 23-3, ..., and selects and outputs the packages successively from the packager and buffers 23-1, 23-2, 23-3, .... Indexes, etc. are set as desired when data from the input signal sources 1 start being reproduced.

Figure 5:
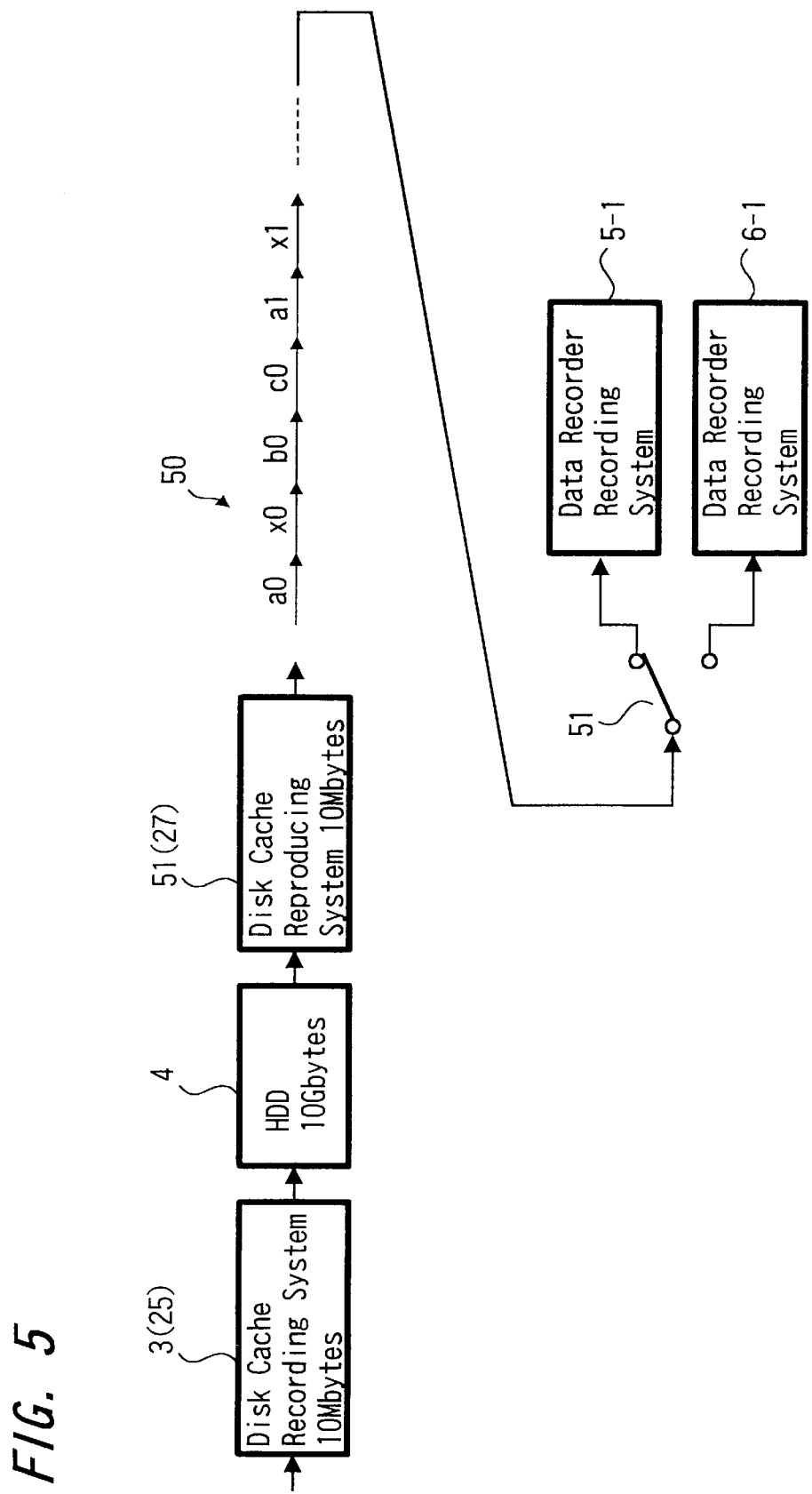
FIG. 5 is a diagram illustrating a process of generating a data stream in the input processing system.

A process of generating a data stream in the input processing system 11 will be described below with reference to FIG. 5 in relation to FIG. 1. The packaged data read into the disk cache recording system 25 of the formatter and cache memory 3 shown in FIG. 1 are successively recorded by the hard disk drive 4 at a high speed. When the data recorded by the hard disk drive 4 reach a suitable quantity, e.g., when the data recorded by the hard disk drive 4 reach a burst size that can be written most efficiently into the data recorders of the data mass storage 5, the data recorded by the hard disk drive 4 start being read, and are stored in the disc cache reproducing system 27 of the hard disk drive 4.

The data stored in the disc cache reproducing system 27 are randomly read, generating data stream 50 a0, x0, b0, c0, a1, x1, ... as successive burst streams having a transfer rate that matches a data rate of the data recorder recording systems 5-1, 6-1. The two data recorder recording systems 5-1, 6-1 are alternately switched by a switch 51, writing therein the data stream 50 a0, x0, b0, c0, a1, x1, ....

Head data are registered as contents data in a reference-list hard disk. Header IDs or contents data are written in the IC card attached to a used cassette by the data recorder recording systems 5-1, 6-1.

The process of writing the data streams 50 into the data recorder recording systems 5-1, 6-1 depends only on the general transfer rate of input data with the writing data rate of the data recorder recording systems 5-1, 6-1 being the upper limit. After the writing of the data is finished, the completed cassette is used by the other data recorder reproducing systems 5-2, 6-2. After the cassette is used, the data recorded in the cassette is erased or other data are written over the recorded data, so that the cassette will be reused continuously.

The data written into the data recorder recording systems 5-1, 6-1 are handled as intermediate data. The data recorder recording systems 5-1, 6-1 are used as a high-speed, large-capacity memory for keeping the input data available real-time.

The process of generating a data stream in the input processing system 11 shown in FIG. 5 will be described with reference to FIG. 2.

As shown in FIG. 2, the packaged data supplied from the package selector 24 are written at a high speed into the disk cache recording system 25. The data written in the disk cache recording system 25 are supplied to the hard disk drive 4. In the hard disk drive 4, striping units, which are units to be written, of data streams of the packaged data supplied from the disk cache recording system 25 of the formatter and disk cache memory 3 are distributed and supplied to the hard disk arrays, and striping units reproduced from the hard disk arrays are combined with the data streams of the packaged data.

The HDD interfaces 29-1, 29-2, 29-3, ... supply the striping units from the stream selector 26 to the hard disk arrays and the striping waits are written in the hard disk arrays, and reproduced striping units are read from the hard disk arrays and supplied to the stream selector 26. The reproduced striping units supplied to the stream selector 26 are combined with the data streams of the packaged data, and supplied to the disk cache reproducing system 27.

The reproduced striping units supplied from stream selector 26 are written at a high speed into the disk cache reproducing system 27. The data streams written in the disk cache reproducing system 27 are written into the data recorder cache 28. The data streams of the reproduced packaged data supplied from the disk cache reproducing system 27 are written at a high speed into the data recorder cache 28. The data streams written in the data recorder cache 28 are supplied to the data recorder 1 interface 30-1 and the data recorder 2 interface 30-2. The data recorder 1 interface 30-1 and the data recorder 2 interface 30-2 output the data streams of the packaged data supplied from the data recorder cache 28 to the data recorder recording systems 5-23 5-1, 6-1 and write them into the data recorder recording systems 5-1, 6-1.

The disk cache recording system 25 and the disk cache reproducing system 27 operate as small-capacity, high-speed caches with respect to the hard disk arrays which are of a high capacity and operate at a relatively low speed. The data recorder cache 28 operates as a small-capacity, high-speed cache with respect to the data recorders which are of a high capacity and operate at a relatively low speed. The stream selector 26 detects when one unit of data (1 Gbyte) to be written in the data recorders is stored in the hard disk arrays. Upon such detection, the stream selector 26 reads all the data from the hard disk arrays, transfers the data to the disk cache reproducing system 27, from which the data are supplied through the data recorder cache 28 and written alternately into the data recorder recording systems 5-1, 6-1 through the data recorder 1 interface 30-1 and the data recorder 2 interface 30-2.

Figure 6:
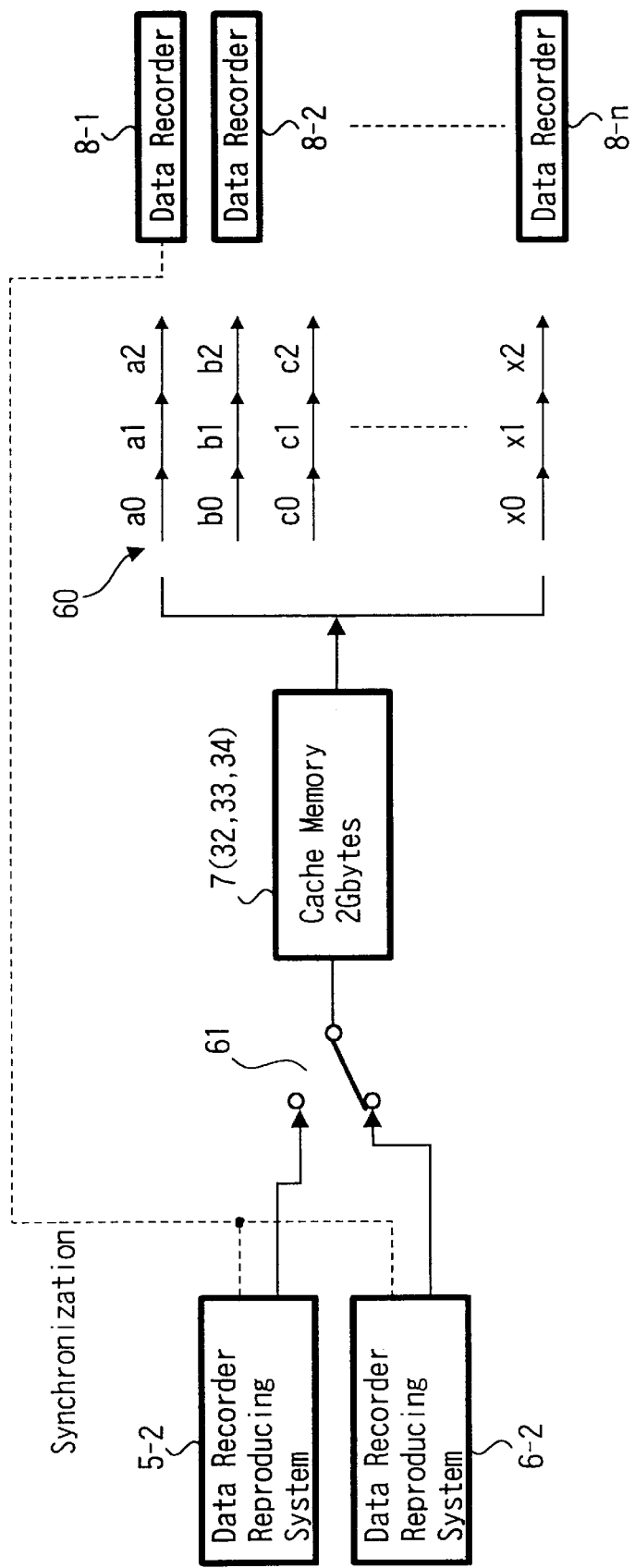
FIG. 6 is a diagram illustrating a process of generating separate data in the transfer processing system.

A process of generating separate data in the transfer processing system 12 will be described below with reference to FIG. 6 in relation to FIG. 1. Concurrent with the process of generating a data format in the input processing system 11 as shown in FIG. 4 and the process of generating a data stream in the input processing system 11 as shown in FIG. 5, the process of generating separate data is carried out by the transfer processing system 12 as shown in FIG. 6. In FIG. 6, data cassettes into which data are randomly recorded by the data recorder recording systems 5-1, 6-1 are loaded into the other data recorder reproducing systems 5-2, 6-2, by which the recorded data are reproduced. The reproduced data are alternately switched by a switch 61 and supplied to the cache memory 7. In the cache memory 7, the data of the same kinds are gathered according to the headers and separated and arranged according to their kinds, and the segments are arranged according to a series of programs, generating separate data 60 a0, a1, a2, separate data 60 b0, b1, b2, separate data 60 c0, c1, c2, ... separate data 60 x0, x1, x2.

The separate data 60 a0, a1, a2, the separate data 60 b0, b1, b2, the separate data 60 c0, c1, c2, ... the separate data 60 x0, x1, x2 are supplied respectively to the data recorders 8-1, 8-2, 8-3, ... 8-n of the data mass storage 8, and recorded therein in the order of segment numbers such that one program will be recorded in one cassette. At this time, the data recorder reproducing systems 5-2, 6-2 operate in their reproducing mode in synchronism with the data recorder recording systems 5-1, 6-1 in their recording mode. As with the data mass storage 5 shown in FIG. 5, a reference list is registered in a reference-list hard disk. Header IDs or contents data are written in the IC card 15 attached to a used cassette by the data recorders 8-1, 8-2, 8-3, ... 8-n.

In this manner, primary archival data are recorded in the data mass storage 8. Before the data are stored in the data base used of the archive 10 of the subsequent archive processing system 13, the data of the intermediate format are successively read by the archive formatter 9 which is prepared as necessary, and converted into data of a final format. After headers with IDs are added to the converted data, the data are transferred to the archive 10.

The process of generating separate data in the transfer processing system 12 as shown in FIG. 6 will be described in detail below with reference to FIG. 3.

The data reproduced by the data recorder reproducing systems 5-2, 6-2 are supplied to the sorter, buffer, and cache memory 7. As shown in FIG. 3, the data recorder 1 interface 31-1 and the data recorder 2 interface 31-2 of the sorter, buffer, and cache memory 7 are supplied with the data reproduced by the data recorder reproducing systems 5-2, 6-2, and supply the reproduced data to the data recorder cache 32. The reproduced data written in the data recorder cache 32 are then supplied to the package separator 33.

The package separator 33 detects IDs in the headers in the package data supplied from the data recorder cache 32, gathers packages of the same kinds supplied from the input signal sources of the same types depending on the IDs, and separates and arranges the packages of the same kinds, generating separate data. The separate data from the package selector 33 are supplied to the buffers 34-1, 34-2, 34-3, . . . .

The buffers 34-1, 34-2, 34-3, . . . store the separated package data up to such a data quantity that they can simultaneously be written in the data mass storage 8. The data stored in the buffers 34-1, 34-2, 34-3, . . . up to the predetermined data quantity are supplied to the data recorder interface 35-1, the data recorder interface 35-2, the data recorder interface 35-3, . . . .

The data recorder interface 35-1, the data recorder interface 35-2, the data recorder interface 35-3, . . . write the package data into the data mass storage 8.

In the data mass storage 8, the data recorder 8-1 records and reproduces the data at a data rate and a recording capacity corresponding to those of the data recorder recording system 5-1 and the data recorder reproducing system 5-2 or the data recorder recording system 6-1 and the data recorder reproducing system 6-2 of the data mass storage 5. The data recorders 8-2, 8-3, . . . , 8-n record and reproduce the data at a data rate and a recording capacity lower than those of the data recorder recording system 5-1 and the data recorder reproducing system 5-2 or the data recorder recording system 6-1 and the data recorder reproducing system 6-2 of the data mass storage 5.

In this fashion, filing data for respective IDs of headers are generated by the package separator 33, and recorded on the filing recording medium by the data mass storage 8. The filing data are primary archival data in the intermediate format.

Operation of the archive processing system 13 will be described below.

The primary archival data read from the data mass storage 8 are supplied to the archive processing system 13. The archive formatter 9 of the archive processing system 13 reads the primary archival data of the intermediate format that have been generated and recorded by the transfer processing system 12, adds ID data as necessary, and converts them into data of an archive format compatible with a regular retrieval system. The archive 10 stores the converted data of the archive format on a data base recording medium, thereby generating a data base.

In the above embodiment, the data mass storages 5, 8 convert data from existing formats into the intermediate format using the data recorder DIR-1000. However, the data mass storages 5, 8 may employ an existing digital VTR (D1, D2, or the like) other than the data recorder, or a data recorder having a new archival format.

The high-speed filing system according to the above embodiment is capable of handling image data that are transmitted by radio waves from broadcasting stations, transmission cables, or the like. If such image data are employed, they may be supplied to the A/D converter and interface circuit 2, or compressed image data may be supplied directly to the formatter and cache memory 3.

According to the present invention, the high-speed filing system has input processing means for processing input signals from a plurality of input signal sources, converting means for converting video signal data of the input signals processed by the input processing means into data of a common intermediate format, recording means for adding identification headers to the video signal data converted by the converting means and recording the video signal data with the identification headers as a series of successive data at a high speed, reproducing means for reading the video signal data recorded by the recording means, data arranging means for rearranging the video signal data read by the reproducing means according to the input signal sources based on the identification headers, and filing recording means for recording the video signal data rearranged by the data arranging means as filing data on a filing recording medium, whereby filing data can simultaneously be generated from the video signal data from the input signal sources and recorded without interrupting the supply of the video signal data from the input signal sources. The high-speed filing system is thus capable of converting video heritages recorded on various mediums in various formats almost automatically into common primary archival data, from which archival filing data can simultaneously be generated from a plurality of mediums and recorded without interruptions. Since the primary archival data can be managed in the form of cassettes, it will be possible to construct an archival data base without any manual intervention at all when automatic data classification will be made possible in the future. The primary archival data can automatically be copied onto new tapes before the service life of the cassette tapes ends, so that the primary archival data can be managed without any manual intervention at all. Therefore, the high-speed filing system can manage a large amount of video data at a highly reduced cost and operate in a reduced period of time.

The input processing means of the high-speed filing system detects a synchronizing signal from an analog signal from an analog signal source, generates a clock signal from the synchronizing signal, and converts the analog signal into a digital signal based on the clock signal. The digital signal converted from the analog signal from the analog input source and digital signals from other digital signal sources allow video heritages recorded on various mediums in various formats to be converted into common primary archival data, from which archival filing data can simultaneously be generated from a plurality of mediums and recorded without interruptions.

Since the converting means divides the video signal data from the input signal sources into segment data of a predetermined size, the video signal data can be converted into data of a common intermediate format with a simple arrangement, from which archival filing data can simultaneously be generated from a plurality of mediums and recorded without interruptions.

The recording means generates headers carrying data indicative of playback devices by which the video signal data are reproduced, recording mediums on which the video signal data have been recorded, data types of the video signal data, segments of the video signal data, lengths of the video signal data, and recording dates of the video signal data. Depending on the contents of the headers, the video signal data can be classified into data of the same kinds, from which archival filing data can simultaneously be generated from a plurality of mediums and recorded without interruptions.

The data arranging means rearranges the read video signal data according to the segments when they are rearranged according to the input signal sources. Therefore, it is possible to generate filing data simultaneously from signals supplied randomly from the input signal sources, so that archival filing data can simultaneously be generated from a plurality of mediums and recorded without interruptions.

Having described a preferred embodiment of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A high-speed filing system comprising:

input processing means for inputting video signal data supplied from a plurality of different input signal sources;

converting means for converting said video signal data supplied from each of said plurality of different input signal sources into respective video signal data of a common intermediate format;

recording means for adding an identification header corresponding to a respective input signal source of said video signal data to the converted respective video signal data from the converting means and for recording the converted video signal data with the respective identification headers as a series of successive video signal data;

reproducing means for reading the converted video signal data and identification headers recorded by the recording means;

data arranging means for rearranging the converted video signal data read by the reproducing means according to the respective input signal source based on the respective identification headers; and filing recording means for recording the converted video signal data rearranged by the data arranging means as filing data on a filing recording medium, whereby the filing data is simultaneously generated from the video signal data from the plurality of different input signal sources and recorded without interrupting a supply of the video signal data from the plurality of different input signal sources.

2. The high-speed filing system according to claim 1, wherein the converting means includes means for dividing the video signal data from the plurality of input signal sources into segment data of a predetermined size.

3. The high-speed filing system according to claim 1, wherein the recording means includes means for generating headers carrying playback data indicative of:

playback devices forming the plurality of input signal sources;

recording mediums whereon the video signal data has been recorded;

types of the video signal data;

segments of the video signal data;

lengths of the video signal data, and recording dates of the video signal data.

4. The high-speed filing system according to claim 1, wherein said data arranging means includes means for rearranging the video signal data read by the reproducing means according to segments when the video signal data is rearranged according to the plurality of input signal sources.

5. A method of filing data, comprising the steps of:

inputting video signal data from a plurality of different video signal data sources;

converting said video signal data supplied from each plurality of different video signal data sources into respective video signal data of a common intermediate format;

recording the converted video signal data with respective identification headers corresponding to a respective input signal source of said video signal data and recording the converted video signal data with the respective identification headers as a series of successive data;

reading said recorded converted video signal data and respective identification headers with reproducing means;

rearranging the converted video signal data read by the reproducing means according to the respective input signal source based on the respective identification headers; and recording rearranged converted video signal data from the step of rearranging as filing data on a filing recording medium, whereby the filing data can simultaneously be generated from the video signal data from the plurality of different input signal sources and recorded without interrupting a supply of the video signal data from the plurality of different input signal sources.

6. The method of filing data according to claim 5, further comprising the step of dividing the video signal data from the plurality of input signal sources into segment data of a predetermined size, wherein the step of dividing the video signal data is performed while converting the video signal data.

7. The method of filing data according to claim 5, further comprising the step of generating headers carrying playback data indicative of:

playback devices forming said plurality of input signal sources, recording mediums whereon the video signal data has been recorded, types of the video signal data, segments of the video signal data, lengths of the video signal data, and recording dates of the video signal data, wherein the step of generating headers is performed while recording the converted video signal data.

8. The method of filing data according to claim 5, further comprising the step of rearranging the video signal data read by the reproducing means according to segments when the video signal data is rearranged according to the plurality of input signal sources.

* * * * *